US012346243B2

(12) United States Patent
Srivastava et al.

(10) Patent No.: US 12,346,243 B2
(45) Date of Patent: Jul. 1, 2025

(54) INTELLIGENT DIGITAL ASSISTANT FOR SOFTWARE TESTING AUTOMATION

(71) Applicant: SAP SE, Walldorf (DE)

(72) Inventors: Deep Srivastava, Gurugram (IN); Shuchita Gaur, Faridabad (IN)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 18/209,228

(22) Filed: Jun. 13, 2023

(65) Prior Publication Data

US 2024/0419578 A1    Dec. 19, 2024

(51) Int. Cl.
G06F 11/3668    (2025.01)

(52) U.S. Cl.
CPC ...... G06F 11/3688 (2013.01); G06F 11/3696 (2013.01)

(58) Field of Classification Search
None
See application file for complete search history.

(56) References Cited

U.S. PATENT DOCUMENTS

| | | | | |
|---|---|---|---|---|
| 8,887,135 B2 * | 11/2014 | Banerjee | ............ | G06F 11/3684 717/124 |
| 2012/0023485 A1 * | 1/2012 | Dubey | .................... | G06F 8/30 717/125 |
| 2015/0256648 A1 * | 9/2015 | Michaud | ............ | H04L 67/1029 709/203 |
| 2018/0197103 A1 * | 7/2018 | Petursson | .............. | G06N 20/00 |
| 2019/0213116 A1 | 7/2019 | Kulkarni et al. | | |
| 2020/0019488 A1 | 1/2020 | Singh et al. | | |
| 2020/0349228 A1 | 11/2020 | Bharrara et al. | | |
| 2023/0135179 A1 * | 5/2023 | Mielke | .................. | G06N 5/022 704/232 |
| 2023/0169147 A1 * | 6/2023 | Sivakumar | .............. | G06N 5/02 382/159 |
| 2023/0237826 A1 * | 7/2023 | Perez | .................. | G06N 3/0475 |
| 2024/0201973 A1 * | 6/2024 | Johnson | .................... | G06F 8/71 |

OTHER PUBLICATIONS

"Selenium Python Tutorial," Geeks for Geeks, www.geeksforgeeks.org, Sep. 9, 2022, 12 pages.
"API Reference," sapui5.hana.ondemand.com, visited Apr. 27, 2023, 2 pages.
"Create production-grade machine learning models with Tensorflow," www.tensorflow.org, visited Apr. 27, 2023, 9 pages.
"Keras," keras.io, visited Apr. 27, 2023, 5 pages.

(Continued)

Primary Examiner — Marina Lee
(74) Attorney, Agent, or Firm — Klarquist Sparkman, LLP

(57) ABSTRACT

A digital assistant can provide support for automated testing of applications. A natural language interface can be provided by which a testing user can specify a request for one or more testing actions. A natural language processing model can recognize intents in the request, and the intents can be used to execute executable code to perform the requested testing actions. Multiple actions per request can be supported. An object repository can be leveraged to determine user interface control identifiers, and a test data container can store values for use during testing. Testing functionality can thus be provided to a wider base of testing users. A real time, scriptless approach can conserve computing resources.

19 Claims, 12 Drawing Sheets

(56) References Cited

OTHER PUBLICATIONS

Brownlee, "CNN Long Short-Term Memory Networks," machinelearningmastery.com, Aug. 21, 2017, 73 pages.
"SQLite Python," www.sqlitetutorial.net, visited Apr. 27, 2023, 2 pages.
"Flask," version 2.0.x, https://flask.palletsprojects.com/en/2.0.x/, visited Apr. 27, 2023, 9 pages.
"SAP Application Testing Solutions by Tricentis—Overview," erpqua.com, Jun. 26, 2021, 26 pages.
European Search Report received in counterpart European Application No. 24181866.5 dated Nov. 7, 2024, 16 pages.

* cited by examiner

FIG. 10

```
Query {to quit, type quit} :Enter Order Type as OR
intent: field
object_index: [1, 2]
value_index: [4]

Query {to quit, type quit} :Check if Customer field is disabled
intent: checks
object_index: [2]
value_index: [5]

Query {to quit, type quit} :Click on Add button
intent: button
object_index: [2]
value_index: []
```
⎫
⎬  Single Step Execution (if data provided, it will take priority, else picked from TDC*)
⎭

```
Query {to quit, type quit} :Create Sales Order with Customer 1030001, Order Type OR, one Material TG0011 with quantity 10 and Plant 1010, and click Save
intent: [appname, field, field, field, field, field, button]
object_index: [[0, 1, 2], [4], [6, 7], [10], [13], [16], [19]]
value_index: [[], [5], [8], [12], [14], [17], []]
```
— Multiple Step Execution Instruction (Data entered would be directly consumed)

```
Query {to quit, type quit} :Create Sales Order with Customer, Order Type, one Material with quantity and Plant, and click Save
intent: [appname, field, field, field, field, field, button]
object_index: [[0, 1, 2], [4], [6, 7], [10], [13], [16], [19]]
value_index: [[], [], [], [], [], [], []]
```
— Multiple Step Execution Instruction (Data picked from TDC* if not entered)

```
Query {to quit, type quit} :Create Sales Order with existing data from TDC
intent: [appname, pick_from_tdc]
object_index: [[0,1,2], []]
value_index: [[], []]
```
— No steps provided by user, asked to pick fields for which data available in TDC

*TDC – Test Data Container

1000

INTELLIGENT DIGITAL ASSISTANT FOR SOFTWARE TESTING AUTOMATION

FIELD

The field generally relates to automated software testing.

BACKGROUND

Although hidden from most end users, software testing continues to be an important part of software development. As software development cycles shrink and development moves to being a continuous cycle, testing grows even further in importance.

The world of software testing requires specialized tools and knowledge, and the demand for skilled testers and their time continues to grow. As part of their craft, testers are faced with having to create and maintain a complex collection of scripts to help with software testing, to the extent that the testing effort becomes a major project in itself.

There thus remains a need for improved software testing technologies.

BRIEF DESCRIPTION OF THE DRAWINGS

FIG. 10 is a walkthrough of different natural language requests showing resulting intents and objects.

DETAILED DESCRIPTION

Example 1—Overview

Figure 1:
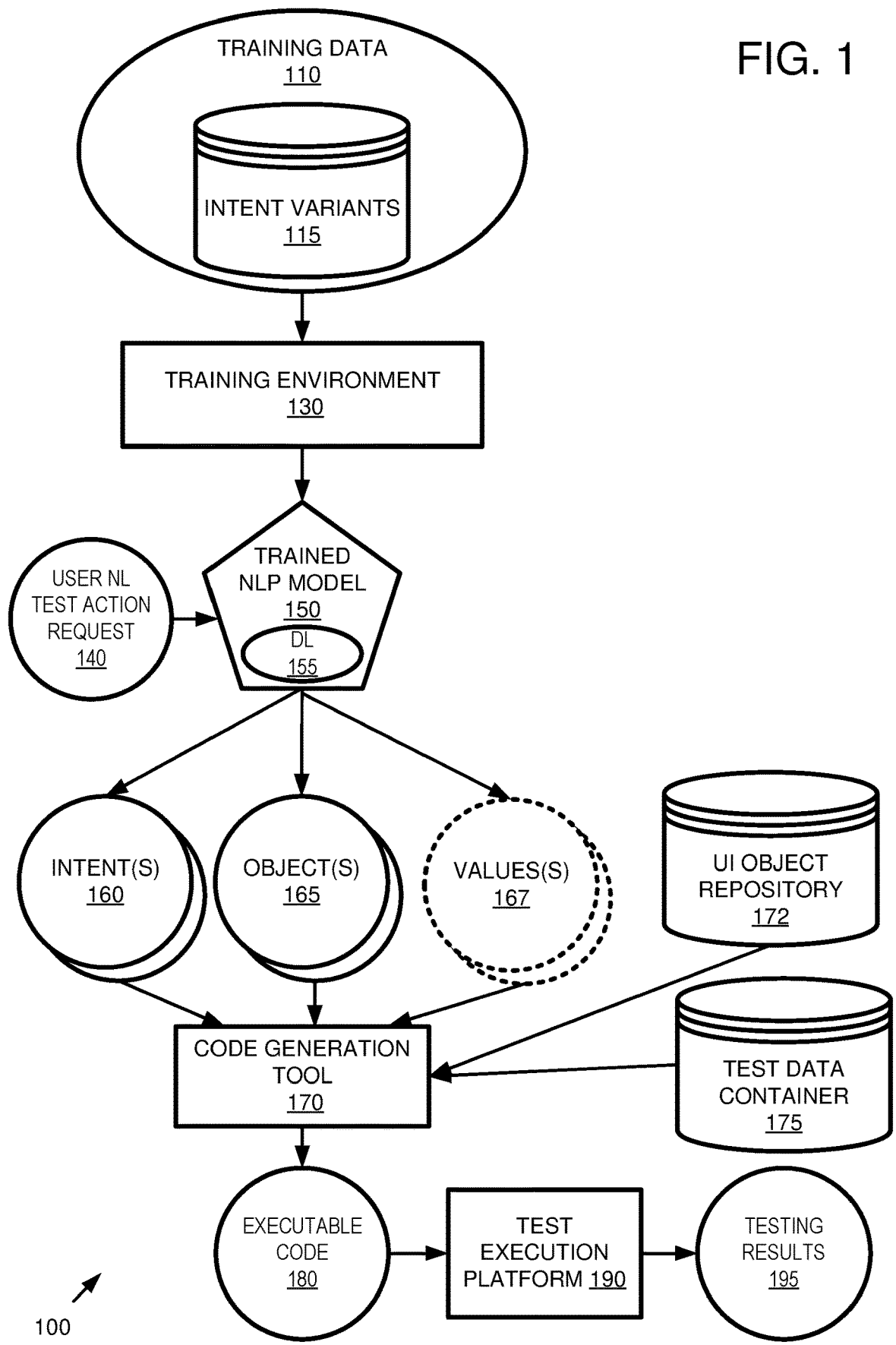
FIG. 1 is a block diagram of an example system implementing an intelligent digital assistant for software testing automation.

As the functionality of software continues to grow, so does the testing required to test it. Traditional approaches of maintaining a large library of scripts that follow developments in the code are becoming unworkable. Further, the complexities of testing environments serve as a barrier to new users, and even experienced users are confined by the limitations of current testing systems.

Existing approaches to record and replay interaction with a user interface can be helpful, but they are limited and typically also rely on the scripting paradigm. Instead, a natural language approach can be used as described herein.

In some environments, test scripting automates one flow per script (or "automate"). For additional flows, variants can be automated explicitly, but dynamic selection of execution is not supported, resulting in a rigid approach.

With a growing focus on making increased functionality and multiple execution options available to end users, the number of possible variations to a standard functional process flow increases dramatically. For example, an Order Checkout use case may involve multiple flows depending on the choice of payment (e.g., credit card, wallet, etc.). For the execution of any step, the details of the control identifier, the testing action to be performed, the value to be passed, the value to be checked, and the like are specified in the script. So, systems that automate one flow per script struggle to achieve increased test coverage of multiple functional variations of an application. Testers can create a separate automate for each possible flow, but such is not a scalable solution for creation and maintenance of the automates. Thus, a better automation framework to create test automates for any flow or variant in an easy and efficient manner is needed.

Instead, a digital assistant user interface can enable a testing user to automate and execute one or more functional flows in a dynamic way, ensuring high flexibility and minimal automation effort. As described herein, a digital assistant can receive input from a testing user in the form of a request to perform a testing action in text form and identify the intent of the incoming request, the user interface control that is involved, and the testing value (if any). Natural language processing with deep learning can identify the testing action with accuracy. The overall experience of the testing user can be a script-less automation, assisted by a digital assistant, which makes possible generation and execution of any flow that the testing user can specify with natural language. Results of testing can then be shared after execution of the requested actions.

As part of setup, the testing user can specify which application is being tested and which system is executing it via the digital assistant user interface. Cloud implementations can be supported. For example, the digital assistant can determine an application tag based on a natural language description of the application and use the tag to access the application via a Uniform Resource Locator (URL) as described herein. Thus, the effort to setup and start testing is also reduced.

Presented with the digital assistant user interface, a user can dynamically specify what is desired in terms of the controls to be covered and the data to be used. The power of natural language processing with deep learning can provide simplicity in the testing process. A testing user can control the automated execution of testing actions with natural language because the technologies can leverage the repository of user interface controls and test data. Thus, a testing user can be shielded from the technical details of underlying user interface identifiers. For example, the user interface control definitions can be leveraged to help identify a control identifier that is then incorporated into executable code to perform a requested testing action. Testing data can be drawn from a test data container.

Runtime creation of automates (e.g., code that performs a testing action) can be supported, avoiding the requirement of a separate script creation/maintenance process by the testing user. Thus, computing resources can be conserved.

In the case of multiple alternate execution flows supported by an application, the effort of creating and maintaining a script library can be avoided. With the digital assistant technologies described herein, a testing user can instead simply specify testing actions via natural language.

As described herein, multiple actions can be specified in a single request. Actions can be stacked before triggering.

Other techniques such as explicitly specifying a value for testing in the testing request can be used as described herein.

The described technologies thus offer considerable improvements over conventional automated testing techniques.

Example 2—Example System Implementing an Intelligent Digital Assistant for Software Testing Automation FIG. 1 is a block diagram of an example system 100 implementing an intelligent digital assistant for software testing automation. In the example, the system 100 can include training data 110 that comprises natural language variants of intent indications, user interface control definitions of a user interface object repository, and the like. In practice, various permutations of possible requests for testing actions can be used for training.

The training environment 130 accepts the training data 110 and generates a trained natural language processing model 150 as described herein. The trained natural language processing model is thus trained to identify intents and indications of user interface controls. In practice, training can be executed once, periodically, or continuously depending on how often the learned patterns become obsolete. As shown, the trained natural language processing model can incorporate deep learning 155 as described herein.

To use the intelligent digital assistant functionality, a user can submit a natural language testing action request 140 to the model 150. In practice, the model 150 can be accessed by a user interface of a digital assistant that receives the request 140 and submits it as input to the model 150. As described herein, additional functionality related to identifying the application and collecting user details can be incorporated into the digital assistant.

As described herein, more than one request can be processed, and compound requests can be supported.

Based on the input 140, the trained model 150 is configured to generate one or more intent identifiers 160 and one or more object indications 165 (e.g., descriptions or identifiers of user interface controls as described herein). The object indications can be drawn from the input 140 (e.g., they appear in the input 140); alternatively, they can be based on the input. Depending on the testing action request, one or more values 167 can also be generated. Again, such values can appear in the input 140 or be based on it.

The intent identifiers 160, object indications 165 (e.g., user interface control indications), and values 167 (if any) are accepted by the code generation tool 170, which executes executable code 180 to carry out the natural language request to perform the testing action for the application. The code generation tool 170 can draw information from the user interface object repository 172. For example, control definitions can be used to find a user interface control identifier associated with a user interface control indicator appearing in the request 140. Alternatively, the model 150 can be trained to output the user interface control identifier based on training data comprising user interface control definitions of the repository 172.

In some cases, data from the test data container 175 can be used. For example, data values can be drawn from the container 175 for certain testing actions.

A test execution platform 190 can receive instructions from or execute the code 180, generating testing results 195 (e.g., change in state, log entries, or the like).

Any of the systems herein, including the system 100, can comprise at least one hardware processor and at least one memory coupled to the at least one hardware processor. The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, the training data 110 can include more training data and test data so that predictions can be validated. There can be additional functionality within the training process. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the training data 110, trained model 150, intent identifiers 160, object indications 165, and the like can be stored in one or more computer-readable storage media or computer-readable storage devices. The technologies described herein can be generic to the specifics of operating systems or hardware and can be applied in any variety of environments to take advantage of the described features.

Figure 2:
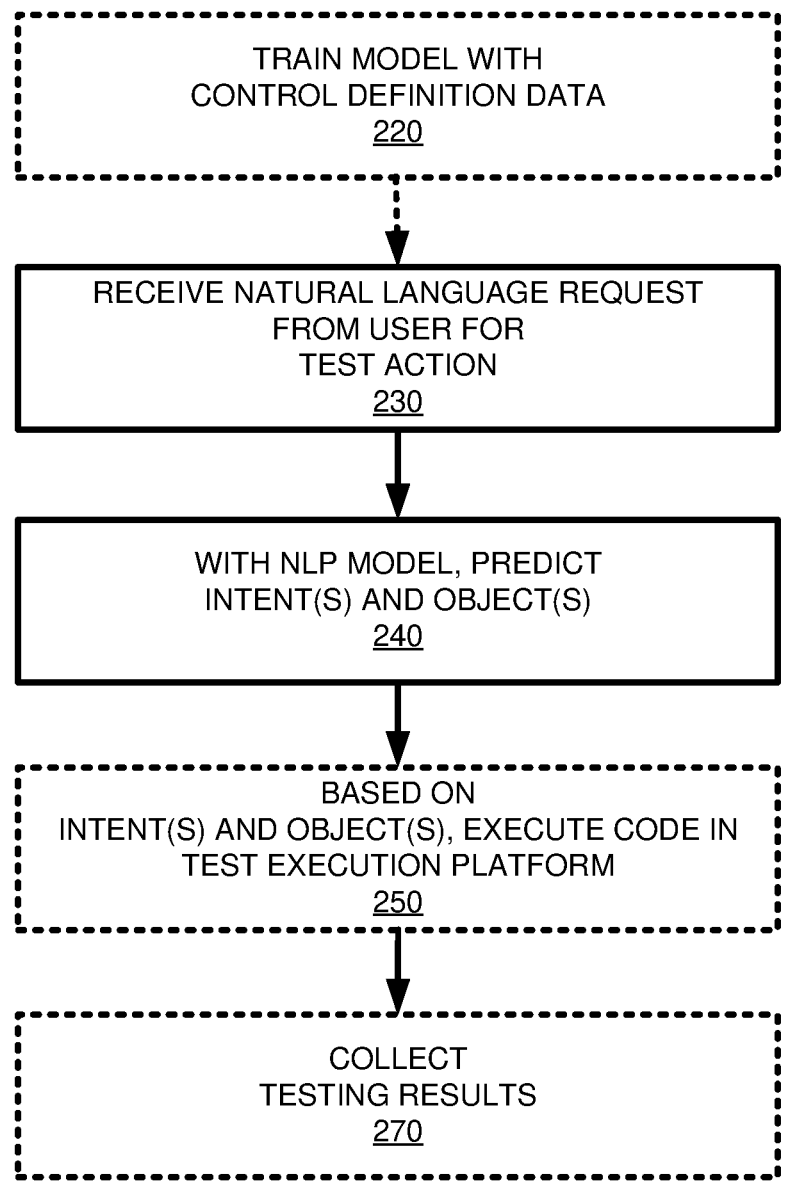
FIG. 2 is a flowchart of an example method of implementing an intelligent digital assistant for software testing automation.

Example 3—Example Method Implementing Intelligent Digital Assistant for Software Testing Automation FIG. 2 is a flowchart of an example method 200 of implementing an intelligent digital assistant for software testing automation and can be performed, for example, by the system of FIG. 1. The automated nature of the method 200 can be used in a variety of software testing situations such as submitting test data, validating user interface functionality, verifying bug fixes, recreating software execution scenarios, and the like.

At 220, a natural language processing model with deep learning can be trained with a plurality of natural language testing action phrases. Such phrases can comprise randomly generated natural language testing phrases generated with natural language intent indication variants as described herein. Testing data can also be drawn from control definition data (e.g., user interface control definitions) of a user interface object repository (e.g., having definitions of the application) as described herein. In practice, training can be performed in advance and by a different party than the user of the intelligent digital assistant.

As described herein, various preliminary steps can be taken to start the intelligent digital assistant. For example, an application name of the application can be received, and an application tag of the application can be determined via an application repository. Testing can be performed with the application tag (e.g., placed in a URL to access the application). Similarly, user details can be received, a target system identifier (e.g., of the system on which testing is performed) can be received, and testing can be performed with the user details and the target system identifier.

The digital assistant can present a digital assistant user interface as described herein. Via such an interface, at 230, a natural language request for a testing action is received from a user. Such requests can take the form of typed natural language requests or spoken requests (e.g., an utterance) as described herein (e.g., "enter order type as OR."

At 240, intent identifiers, object indications, and values (if any) of the request are output from the natural language processing model based on the request.

In practice, 240 is implemented by inputting the request to the natural language processing model with deep learning and receiving, from the model, one or more intent identifiers and one or more user interface control indications. One or more testing values can also be received. The user interface control indications can comprise indications of user interface controls such as a name or identifier. A given intent identifier out of the intent identifiers is associated with the user interface control indication.

As described herein, the model can be trained to identify intents and indications of user interface controls. The intent identifier itself typically does not appear in the request. Instead, it must be determined by the model based on the content or structure of the request. For example, "Enter 7 in quantity" refers to a field intent (e.g., enter a value into a field). The indications of the user interface controls can appear in the request as a reference to a particular user interface control (e.g., "quantity"). Alternatively, a user interface control identifier can be derived from one or more tokens appearing in the request (e.g., "qty_field" refers to the quantity field). Internally, the model can identify tokens in the request as being objects (control indications), values, application names, or the like. Training can be achieved by labeling tokens in training phrases with ground truth labels (e.g., object, value, etc.).

At 250, based on the given software testing intent identifier and the user interface control identifier, executable code to carry out the natural language request to perform the testing action for the application is executed. A user interface control identifier can be determined by querying an object repository that comprises a definition of the user interface control. Alternatively, the model can be trained to output the identifier. As described herein, executing the code can comprise choosing an executable statement type based on the given intent identifier and including the user interface control identifier in the statement. Although real time implementations are described herein, embodiments in which code is generated for later execution can be supported. Thus, both scriptless and script-based approaches can be implemented.

At 270, testing results are collected. For example, results of execution can generate test results (e.g., change in state, log entries, or the like).

As described herein, more than one request can be processed by the digital assistant, and compound requests can be supported. For example, the request can comprise multiple testing actions, the model can recognize such actions, and the executable code can perform the multiple testing actions. Multiple data sets can also be supported. For example, the request can comprise multiple testing actions and specify multiple data sets, the model can recognize the actions and data sets, and the executable code can perform the actions with the data sets.

Another scenario involving multiple requests can be to stack requests until a trigger indication is received. For example, the model can be applied to additional requests, and receipt of a trigger indication can trigger execution of the executable code and the additional executable code for the additional requests.

Further, multi-flow implementations can be supported.

Explicit field values for testing need not be specified in the request. For example, responsive to determining that no data value is specified for an intent with a data value prerequisite, a data value can be read from a test data container and incorporated into the executable code. Thus, the data from the test data container can be used to test the application when the executable code is executed.

However, explicit field values can be specified and used by the digital assistant. For example, if the request specifies entering a value into a field, the one or more intents comprises a field entry intent, the natural language processing model outputs the value, the user interface control indication comprises an indication of the field, and the executable code contains instructions to place the value in the field.

As described herein, a variety of software testing intents can be supported. Intents such as field entry, button press, check value, and the like can be supported.

In the case of a testing action specifying an action to be performed on an input field (e.g., the intents comprise a field entry intent), the input field may have a field identifier that is not actually specified in the natural language request. The natural language processing model recognizes that the testing action is to be performed on the input field and outputs a user interface control indication of the input field. For example, the request may refer to a field "Order Type," and the model can indicate that "Order Type" is a user interface control indication. The model can output an object name, and an identifier can be extracted from an object repository as described herein.

In the case of a pushbutton, the testing action comprises pushing a button the user interface of the application, the given software testing intent identifier indicates pushing of a button, and the executable code performs pushing the button of the user interface of the application.

Other examples for other controls are described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving a request can be described as sending a request depending on perspective.

Example 4—Example Natural Language Request

In any of the examples herein, an intelligent digital assistant can receive requests in the form of a natural language request. Such requests typically are requests to perform a testing action in a user interface of an application. Various examples are shown herein. As described herein, a natural language processing model can recognize intents within a request, and executable code can be executed to perform the requested testing action. Such a request can also be called a "command," "directive," or the like.

Although a request can be a simple request to perform a single action, compound requests can be supported. For example, a single input can specify multiple testing actions. Another form of plural requests is to stack single requests until a trigger is received (e.g., a trigger word such as "go," "trigger," "execute," or the like). Then, the testing actions can be executed. Executable code can be executed as each request is received, or all together.

Another multiple request scenario is an action that specifies plural test data instances (e.g., "Enter Order Type with test case 1, then enter order type with test case 2.") In such a case, two separate executions can be performed, one with each of the test data instances.

Also, multi-flow scenarios can be supported. For example, one instance may involve execution flow along one path (e.g., pay with credit card), while another instance may involve execution along a separate path (e.g., pay with token). For example, two separate executions as described above can be implemented. The test data container can store labels of data sets (e.g., "test case 1," "wallet test case 1," or the like).

Another multi-flow scenario can be supported in which two separate flows are triggered for performing specified instructions. For example, a natural language request of "Execute the steps for the Order Types 'STD1' & 'CBFE'" followed by a set of instructions results in triggering two separate flows performing the remaining set of instructions provided for both the order types specified. In such a feature, the natural language request comprises multiple scenarios and multiple testing actions. The natural language processing model can recognize the multiple testing actions, and the executable code performs the multiple testing actions for each of the multiple scenarios (e.g., different order types, or the like).

Example 5—Example Testing Action

In any of the examples herein, a wide variety of testing actions can be supported by the digital assistant. Such actions can include entering data into fields, checking the value of fields, checking the status of fields (e.g., whether disabled), pushing buttons, selecting an item from a dropdown menu, entering a date, clicking on a checkbox, selecting a radio button, getting the value of a control, and the like.

Other actions can relate to starting the session with the digital assistant. For example, an application name can be specified.

Still other actions can relate to specifying a test data container (e.g., that data is to be selected from a test data container).

In practice, a testing action is recognized and output by the natural language processing model as an intent, which is represented internally as an intent identifier.

| Intent identifier | Description | Example(s) |
|---|---|---|
| Field | Enter a value into a field | "enter <field name> as <value>"<br>"enter <field name>" |

-continued

| Intent identifier | Description | Example(s) |
|---|---|---|
| Check | Checks whether a field is enabled | "Check if <field name> field is enabled" |
| Button | Push a button | Click on <control name> button |
| Dropdown | Select a value from a dropdown menu | "Click on <control name> dropdown and click on the <value>" |
| Date | Enter a date | "enter <control name> date as <value>" |
| Checkbox | Select a checkbox | "click <control name> checkbox" |
| Radio | Select a radio button | "click <control name> radiobutton" |
| Get | Read a value from a control | "get value of <control name>" |
| Appname | Specifies the application | "create sales order" |
| Pick_from_tdc | Specifies that data from test data container is to be used | "Create Sales Order with existing data from TDC" |

As described herein, if a value is not explicitly specified in the request, a value can be drawn from a test data container and used for the request to achieve testing.

Example 6—Example Natural Language Testing Action Phrases

In any of the examples herein, the natural language processing model can be trained with natural language testing action phrases. In practice, such phrases can be generated as part of the training process as described herein. Subsequently, when the model receives a request, it can identify the intent of the request, indications of controls, and values (if any).

Example 7—Example Application

In any of the examples herein, any of a variety of applications can be supported for testing. The level of granularity of an application can vary. For example, an application can be defined a collection of functions, or each function can be designated as a separate application. In practice, applications can share a user interface object repository. Thus, training can be run on the repository for a digital assistant that supports multiple applications.

In practice, testing is carried out on the user interface of an application. Thus, training centers on recognizing user interface actions such as entering values into fields, selecting pushbuttons, and the like.

In an execution environment, a plurality of applications can be supported. Applicants can be identified by application identifiers stored in an application repository. In practice, a tag can be used to access the application. For example, in a cloud-based implementation, an application tag can be incorporated into a uniform resource locator (URL), and the application can be accessed with a browser. In practice, both production and testing environments can be supported, with testing taking place in the testing environment.

Other information such as user details (e.g., username and password) can be received and used to access the application. Other items described herein (e.g., object repository and test data container) can be accessed via the user details, the digital assistant can act as an agent, or the like.

The assistant can thus take care of the logistical details of connecting to the application, entering user details, and the like.

Example 8—Example User Interface Object

In any of the examples herein, objects related to an application can be stored in an object repository (or simply "OR"). Due to the focus on testing, examples herein describe a user interface object repository, but non-user interface objects can be included. In practice, user interface objects are typically called "user interface controls" or "controls" and can include fields, text labels, check boxes, radio buttons, buttons, dropdown boxes, and the like.

The internal representation of a user interface control includes an indication of the control in the form of a control identifier. In practice, a user may not be aware of the control identifier and may identify it by a common name, display name, or the like.

The natural language processing model can recognize that the indication is a control (e.g., indicate the words in the request that specify the control), and the object repository of the application can be queried to determine the control identifier. For example, a control definition of a control having a specified control type (e.g., as specified in the natural language request or generated from the model, such as button, dropdown, checkbox, or the like) and name can be found. Other attributes of the definition such as data type can also be used. As described herein, an identifier of a user interface control can be persisted as an object repository identifier (e.g., used to lookup the control identifier) or the control identifier itself.

Entries in the object repository can be stored in a database with a primary key of the application tag (e.g., salesdocument-create) and a unique Object Repository ID (e.g., 3CA82A21E819ED). Based on the received control name (e.g., "save") for the application, the related object repository ID can be fetched from the table and referenced during query processing. On triggering execution, the control identifier (e.g., control ID for save: application-salesdocument-page ViariantID-save) is fetched using the Object Repository ID and passed for execution.

In some embodiments, the natural language processer can recognize the control indication as specifying a control having a particular control identifier and output the control identifier, which can then be incorporated into executable code to achieve the testing action requested in the natural language request.

As described herein, the user interface of an application comprises a plurality of controls that are defined by control definition stored in an object repository, and definitions can be specific to an application.

Example 9—Example Test Data Container

In any of the examples herein, test data can be organized and stored in a test data container. The digital assistant can access data in the test data container and include the data in executable code to carry out testing.

A test data container can be implemented to help organizations with maintenance of the data consumed for various processes. Data can be maintained in the test data container for applications as a test data container database table, which can be kept up to date so it is ready to use and can be easily referenced. Such an approach also helps simplify the overall effort of maintaining test data.

For example, as described herein, if a request specifies a field, but no value is explicitly specified by the request, the value can be retrieved from the test data container and used to fill the field (e.g., the value is entered into the field by the executable code).

The test data container can organize data into test cases, applications, and the like for ease of retrieval. Labels can be applied to test cases to allow easy retrieval with a request (e.g., "fill fields with wallet test case 2"). As described herein, multiple test cases can be supported in a single request.

Example 10—Example Digital Assistant User Interface

In any of the examples herein, the user interface presented to receive requests can take the form of a digital assistant user interface. For example, a simple prompt that accepts freely typed or spoken requests can be presented. A conversational style of user interface can be presented. For example, a familiar chat window can be presented, and the digital assistant can operate as a chatbot.

A friendly user interface can help set expectations and allow any user to begin with software testing actions, even if the user has no experience with the application or the technical details of the user interface control internals.

Example 11—Example Executable Code for Performing Test Actions

In any of the examples herein, a wide variety of executable code types can be supported. For example, directly executable code, interpreted code, scripting languages, or the like can be supported. Any executable code that comprises statements that, when executed, interact with user interface controls can be used.

Execution of such statements can be accomplished by choosing a statement template or statement type based on the recognized intent and then incorporating the control identifier and value (if any) into the statement.

For example, in a real time implementation, execution can branch to a portion of the code for handling a particular intent. The control identifier can be incorporated into the code along with testing value (if any). Alternatively, a temporary script can be created by adding (e.g., printing) elements to statements that are subsequently executed, either immediately or stored for later execution.

One implementation uses Python with Selenium. Although Python is shown as an example, in practice, any programming language that can achieve functionality related to interacting with user interface controls as described herein can be used.

Example 12—Example Runtime Execution

In any of the examples herein, executable code can be executed at run time. For example, instead of having to create a script and then execute the script, the user can simply specify desired testing actions. As described herein, executable code to carry out testing actions can then be executed.

Although a script may or may not be created internally, the user is shielded from such details, meaning that a no-code implementation can be achieved. By shielding the user from the process of having to create and execute a script, the technologies open up software testing to a greater number of people. For example, a tester may have great skill in identifying troublesome use cases but may not care to learn the details of yet another scripting language and the related creation and maintenance system. The technologies allow such a tester to immediately begin testing an application.

Also, avoiding the creation and maintenance of a large library of scripts can save on storage space. For example, after execution, scripts can simply be discarded.

Of course, if a user wishes to generate a library of scripts with the technology, such an implementation can be supported, allowing quicker creation of such a script library with having to know the details of the script language.

Example 13—Example Testing Results

In any of the examples herein, testing results can be monitored in a variety of ways. For example, log entries can be generated by the executable code to record events that take place. Specialized logging software can be used.

Logging can memorialize changes in state, status of controls, or the like. The verbosity of the log can be controlled via configuration (e.g., a high-level log that shows an outline or a verbose log that provides numerous details about execution). Errors can also be recorded to the log (e.g., when a control does not have an expected value).

Example 14—Example Natural Language Processing Model

In any of the examples herein, a machine learning model can be used to generate predictions based on input testing requests. In practice, any number of models can be used. Examples of acceptable models include those related to natural language processing as described herein. Such models can comprise deep learning. The models are stored in computer-readable media and are executable with input data to generate an automated prediction. An intent and user interface control indications (e.g., appearing in the request) can be predicted. In practice, the predictions are used as output to generate executable code to carry out the request.

Figure 3:
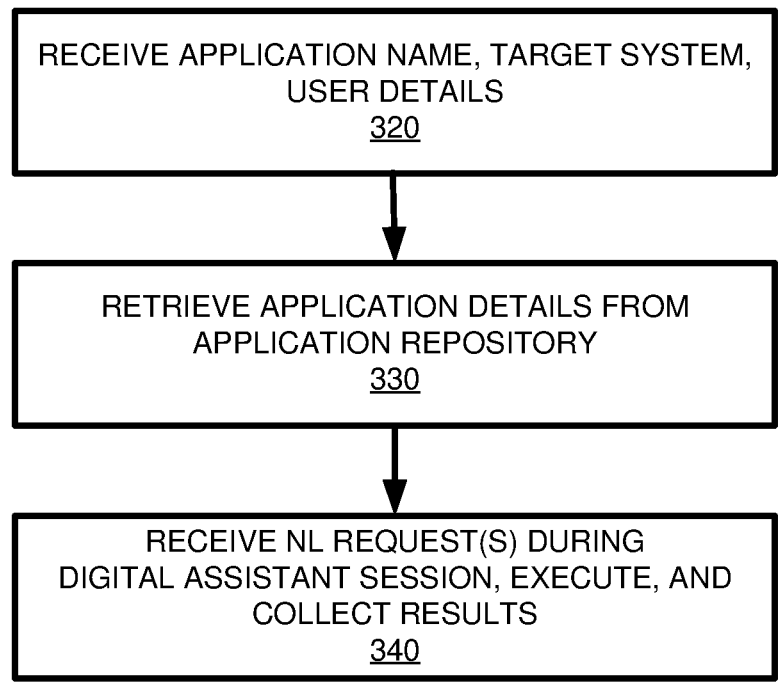
FIG. 3 is a flowchart of an example method of starting an intelligent digital assistant for software testing automation.

Example 15—Example Method of Starting Intelligent Digital Assistant for Software Testing Automation FIG. 3 is a flowchart of an example method 300 of starting an intelligent digital assistant for software testing automation and can be performed, for example, by the system of FIG. 1.

In the example, an application name, target system, and user details are received at 320. In practice, configuration can be set up to remember the most recent settings so that they need not be entered again. However, the user can specify an application name.

The target system can also be received and used to determine the test execution platform. Similarly, user details can be received (e.g., username and password) so that a connection to the application can be completed (e.g., execution of the application is started).

At 330, the actual application identifier can be determined by searching an application repository that contains data about applications. The application tag can be determined, and such tag can be used to access the application via a Uniform Resource Locator (URL) as described herein.

In this way, the digital assistant can take care of the technical details of forming a connection to the application.

At 340, natural language requests can be received during a session with the digital assistant, such requests can be executed and results executed as described herein.

Example 16—Example Confidence Score

In any of the examples herein, the trained natural language processing model can output a confidence score with any predictions. Such a confidence score can indicate how likely it would be that the intent is in the request, whether the control identifier is correct, or the like. Such a confidence score can indicate the relevance of a predicted intent for a given request. The confidence score can be used as a rank to order predictions.

Also, the confidence score can help with filtering. For example, the score can be used to filter out those intents with low confidence scores (e.g., failing under a specified low threshold or floor).

In practice, the model can operate with a high level of confidence. However, if desired, the model can prompt when the confidence is low (e.g., "I believe you meant to fill in the PO Adjustment field. Is that correct?").

Example 17—Example Software Testing Intents

Figure 4:
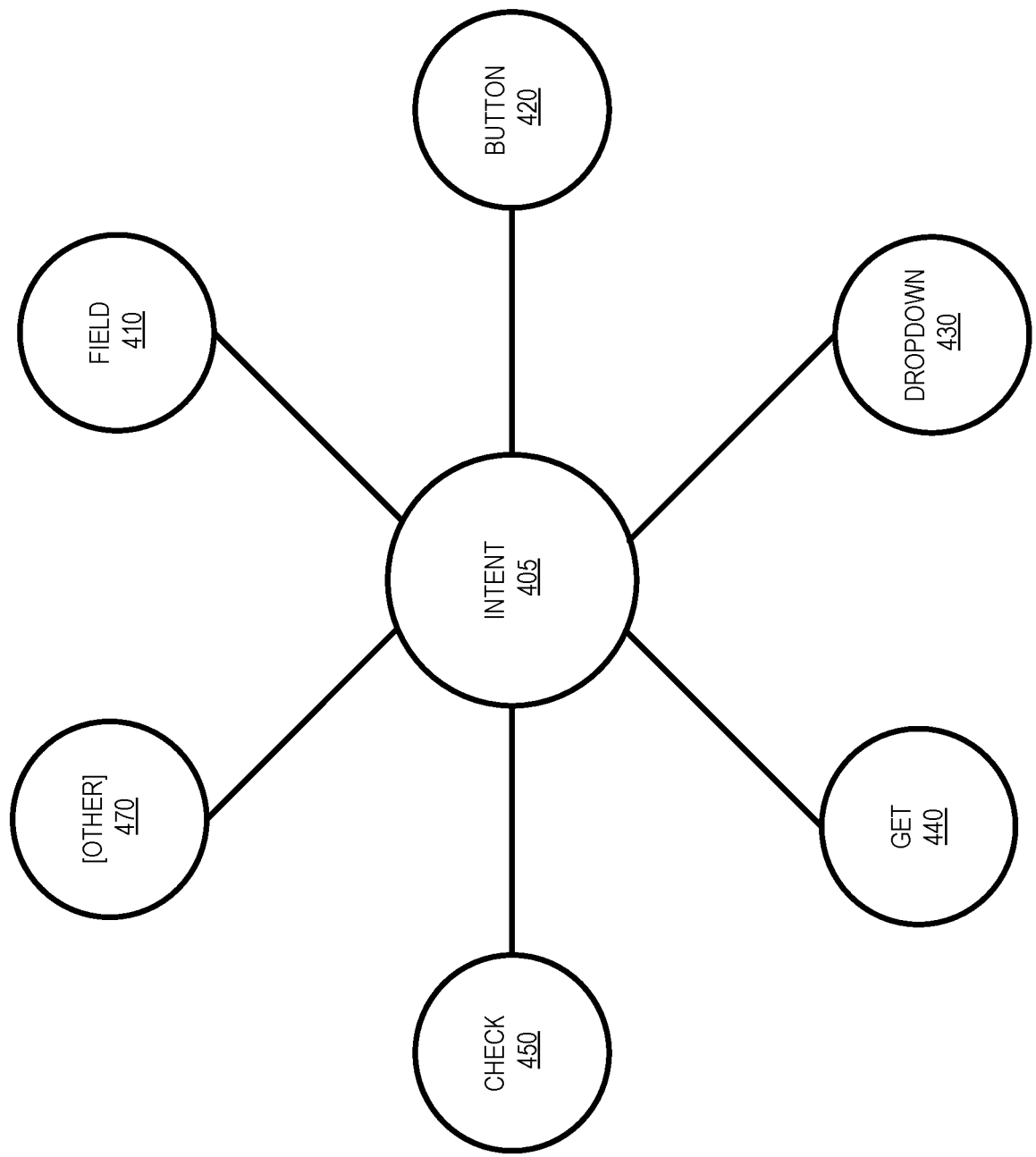
FIG. 4 is a block diagram of example software testing intents.

FIG. 4 is a block diagram 400 of example software testing intents. A plurality of intent types 405 can be supported, including field 410, button 420, dropdown 430, get 440, check 450, and others 470.

As described herein, a natural language processing model with deep learning can analyze an incoming request and determine the intent(s) associated with the request.

Example 18—Example Solution Architecture

Figure 5:
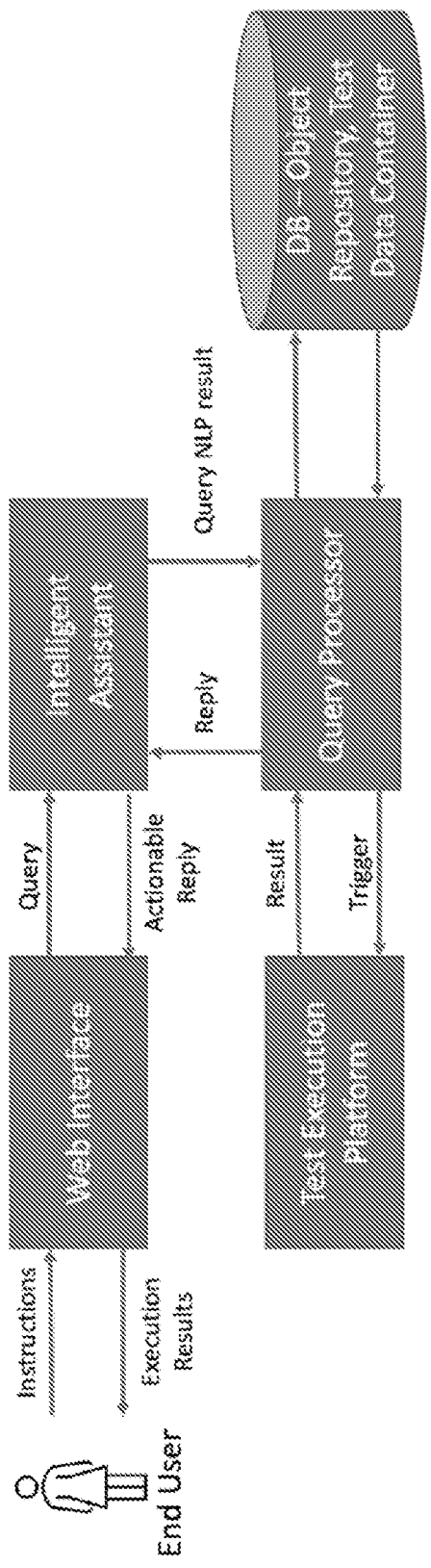
FIG. 5 is a block diagram showing an example solution architecture for implementing an intelligent digital assistant for software testing automation.

FIG. 5 is a block diagram showing an example architecture 500 for implementing an intelligent digital assistant for software testing automation that can be used with any of the examples herein.

The digital assistant can be created using Python libraries and deep learning and natural language processing technologies. For execution, Python-Selenium can be used. However, the technologies can be equally applied to other scenarios involving other programming languages. Similarly, although English is shown in examples as a natural language, other natural languages can be equally supported.

The technologies can be integrated with an object repository that includes user interface control definitions and a test data container.

In the example, a testing user provides a testing action request (e.g., instructions to carry out a testing action) to a web interface (e.g., at a high level using natural language), which forwards the request to an intelligent assistant that contains the natural language processing functionality described herein. The intelligent assistant interprets the request and generates an appropriate query for consumption by the query processor, which can interact with database(s) containing an object repository, test data container, or the like to obtain identifiers, test data, or the like. The query processor can generate executable code. Upon a trigger, the query processor can execute or send executable code to the test execution platform to execute code generated from the request. Results are then sent back to the query processor, which forwards the results to the intelligent assistant, which can then provide an actionable reply to the web interface, which displays the results to the testing user.

Variations are possible by separating functionality, combining functionality, or the like.

Example 19—Example Database Tables

Figure 6:
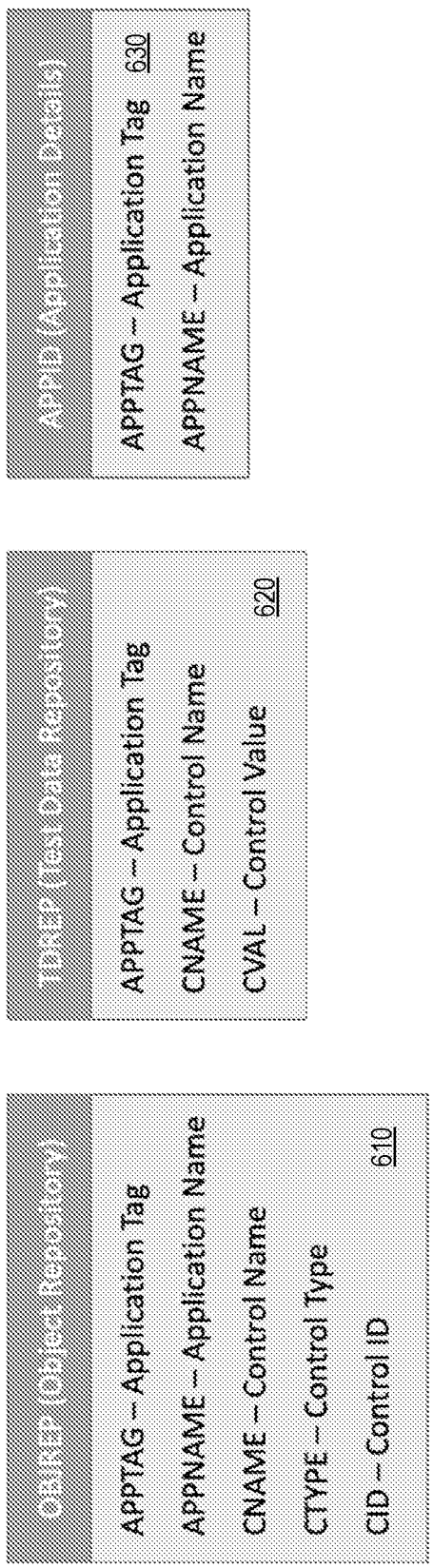
FIG. 6 is a block diagram of example database tables for implementing an intelligent digital assistant for software testing automation.

FIG. 6 is a block diagram of an example database tables 600 for implementing an intelligent digital assistant for software testing automation and can be used in any of the examples herein. In practice, other arrangements are possible while still providing the desired functionality.

The object repository table 610 can store fields for application tag, application name, control name, control type, control identifier, and the like. Thus, the object repository can identify elements such as user interface control for a particular application, which is denoted by the application tag and application name. For example, a user interface object repository as described herein can be implemented with such a table. Controls for plural applications can thus be stored in a single repository and shared across applications. Thus, the digital assistant can work with a plurality of applications.

The test data repository table 620 can store fields for application tag, control name, control value, and the like. For example, the test data container can hold data values for respective controls (e.g., supplier value=S1030001), which can be used during runtime for the data values provided for incorporation into executable code. Such a repository can serve as a test data container as described herein. In practice, plural sets of test data can be supported for a single application.

The application details table 630 can store fields for application tag, application name, and the like. Such a table can serve as an application repository as described herein.

Example 20—Example Training Data

Figure 7:
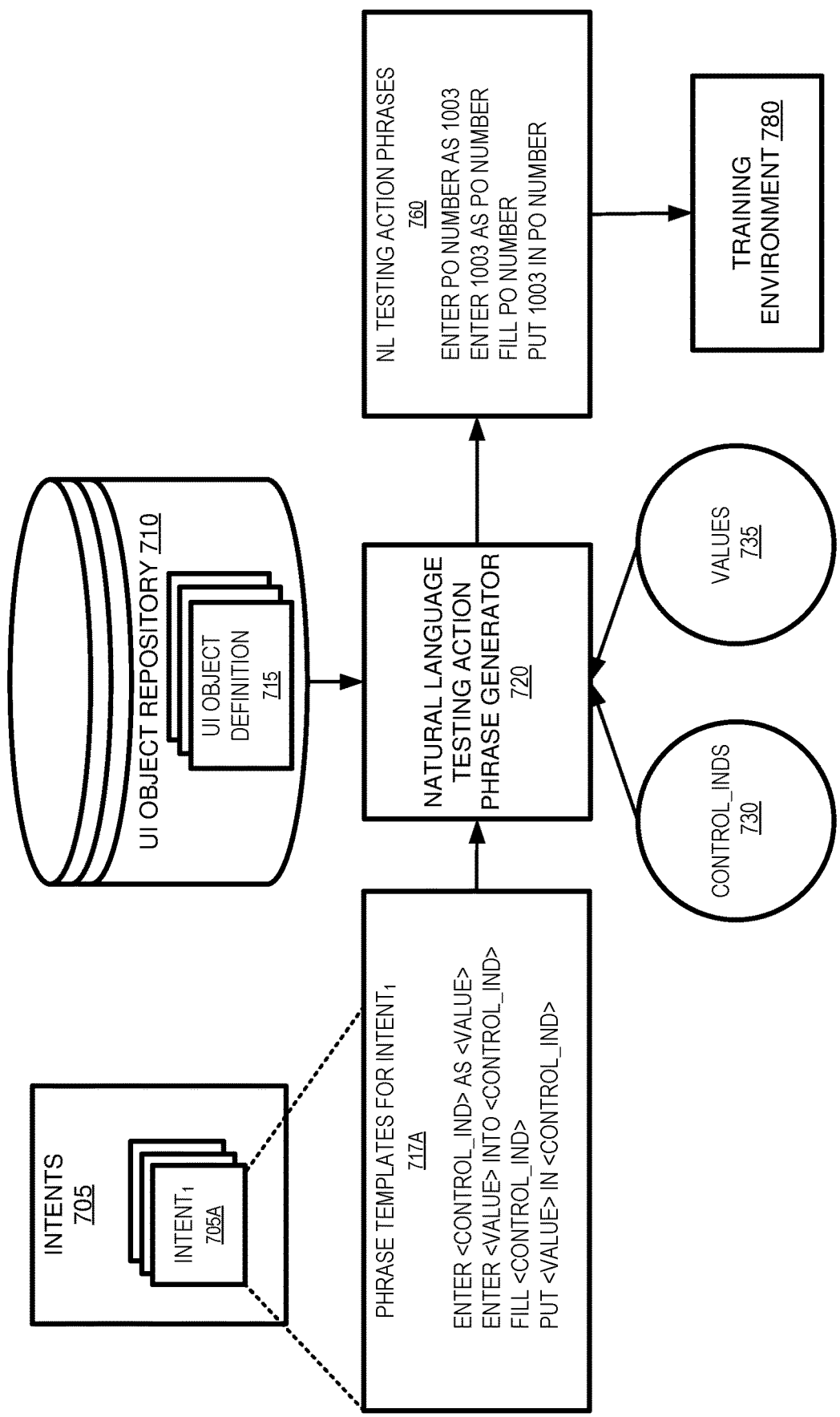
FIG. 7 is a block diagram of example training data for implementing an intelligent digital assistant for software testing automation.

FIG. 7 is a block diagram of example training data in a training environment 700 for implementing an intelligent digital assistant for software testing automation. In the example, natural language testing action phrases 760 are generated for the training environment 780. Such phrases can be generated in a variety of ways to provide for a robust natural language processing model. Training can be achieved by labeling tokens (e.g., words) in testing action phrases with ground truth labels (e.g., "object," "value," etc.) and training the model on the phrases and labels.

In the example, natural language intent indication variants can be combined with user interface control indications, value indications, or both. The user interface control indications can be drawn from actual user interface control indications present in user interface control definitions. For example, control identifiers, display names, alternate names, metadata such as help text, and the like can be used as user interface control indications for training. If available, the control definitions of the application for which testing is conducted can be used for training.

Natural language intent indication variants can be generated for respective intents 710 by enumerating various possible requests and varying the language while keeping the same intent. In practice, testing users may use a variety of natural language to indicate the same intent. For example, a "field" intent that indicates entering data into a field can be indicated by "enter," "fill," "place," or the like. Natural language variants can be grouped or labeled during training to preserve association with the ground truth intent during training. Including more variants can make intent recognition more robust.

To leverage the variants, natural language testing action phrase templates 717A can be generated for a particular intent 705A out of a plurality of intents 705 by using the natural language intent indication variants in the template text. In practice, a template phrase can be generated for the intent variants, and the control indications 730 added (e.g., via permutations such as mechanically or randomly) by a generator 720 to generate phrases 760. Control indications 730 can be drawn from a user interface control definition 715 of a user interface object repository 710. The templates 717A can include slots for control indications and value indications. For example, the "field" intent that indicates entering a value in a field can be indicated by "enter <fieldname>." Variants include "Fill <fieldname>," "put <fieldname>," and the like. Phrases with values can be generated via template phrase such as "put <value> in <fieldname>". Values 735 can be randomly chosen according to values accepted by the control type as indicated in the definitions (e.g., definition 715 and others). Although phrase templates 717A for a single intent are shown, in practice, templates can be generated for a plurality of intents 710. The ground truth for words appearing in the phrases can be tracked for training (e.g., each word is assigned a tag such as "control indication," "value," or the like). In practice, a generic "object" tag can be used for control indications, application names, and the like.

In the example, a user interface object repository 710 stores a plurality of user interface object (control) definitions including the definition 715. In practice, the definition 715 can be extended to include metadata about the represented control as described herein. The control definition 715 can be from the application under test or from another application that has similar characteristics. The repository 710 can store application artifacts for objects other than controls. Automated testing can leverage the repository 710 to enable an intelligent digital assistant for software testing automation testing as described herein.

The definition 715 comprises various data related to a defined control that can be used for training (e.g., control identifier, control name, alternate display name, description, control type, and the like). Such information can comprise natural language descriptions of the control as well as its identifier. Such data can be useful for identifying that a control is being referred to, to recognize the name of a control and find the counterpart control identifier, or both.

As shown, phrase templates 717A and phrases 760 can include value indications. When filled, such values can be exemplar data values that would be entered in the user interface (e.g., "1003") or check data (e.g., "disabled").

In practice, the natural language testing action phrases emulate expected requests and can thus be used for training. Subsequently, re-training can be done to update the model as needed. For example, natural language tends to evolve over time, and additional controls or control types can be introduced (e.g., "click," "tap," "grab," or the like).

As shown, intent variations for various intents can be used for training. In the example, the variations comprise variations for a particular intent (e.g., "field"). Various variations (e.g., "enter," "fill," "put," or the like) can be used as input to the training environment 780 for the natural language processing model, enabling the natural language processing model to recognize a field intent, even if it may take any of several forms. Phrases can be labeled with their ground truth intent during the training process.

For example, "fill PO number" can be translated to a field intent and the user interface control indication "PO number." The control identifier "app7_pofield4" can be determined by querying an object repository such as repository 710 or automatically provided by the model.

Subsequently, the intent can be used to choose a statement type, and the control identifier can be incorporated into the statement type to execute executable code that, when executed, enters data in the field displayed as "PO Number."

Although a single training process 780 is shown, in practice, training can be bifurcated between control identification and intent identification. However, to the user, a single assistant is presented that shields the user from such complexity. Instead, the user simply perceives the assistant as a chat companion who can be instructed to perform testing actions using natural language.

Example 21—Example Object Repository Querying

Figure 8:
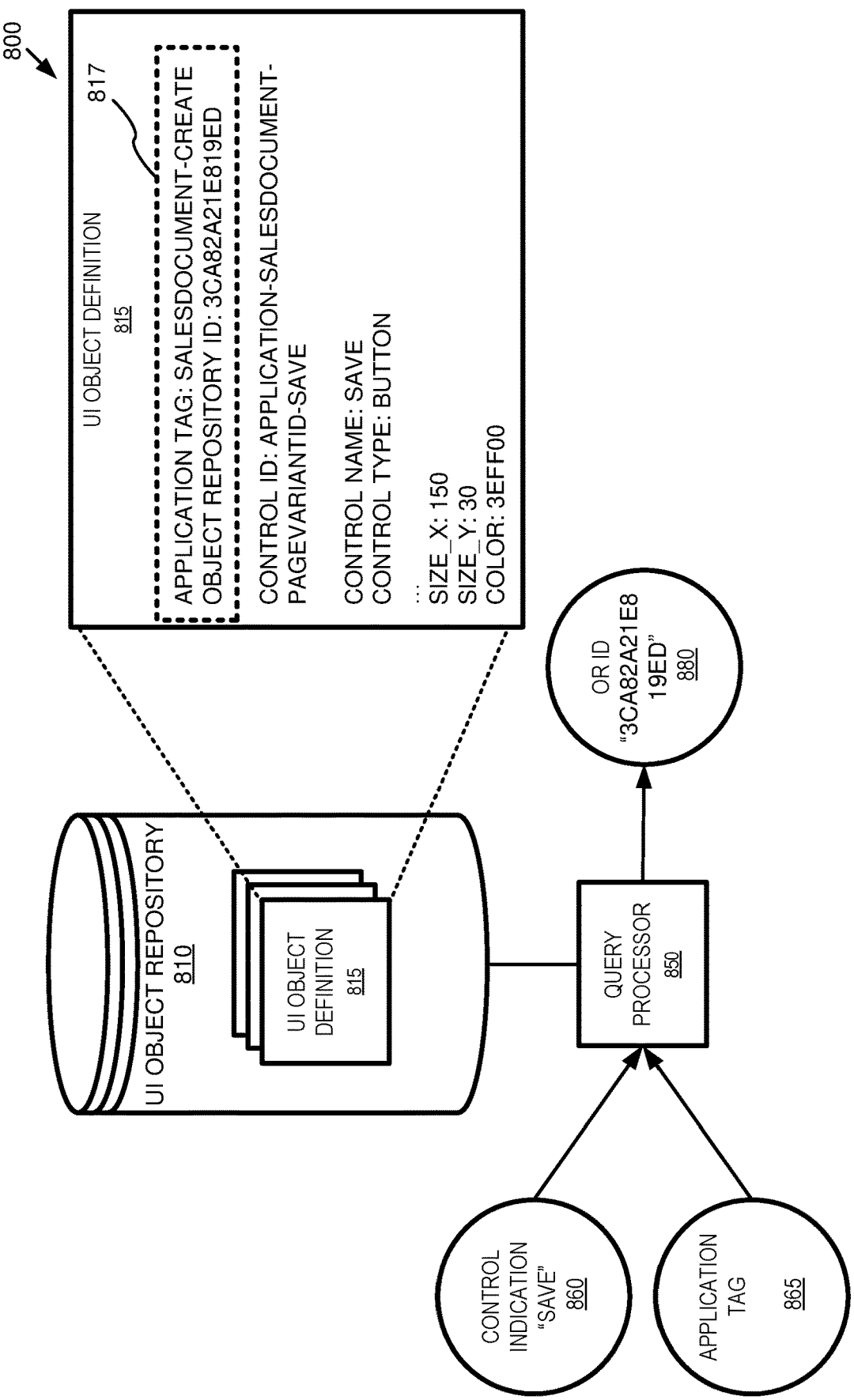
FIG. 8 is a block diagram of example system querying an object repository for implementing an intelligent digital assistant for software testing automation.

FIG. 8 is a block diagram of example system 800 querying an object repository for implementing an intelligent digital assistant for software testing automation that can be used in any of the examples herein. In the example, user interface control (object) definitions 815 are shared in a user interface control (object) repository 810.

As shown a user interface control definition 815 comprises various attributes. The application tag and object repository identifier can serve as primary keys 817, and the definition 815 can comprise a control identifier.

In practice, the query processor 850 can receive an indication of a user interface control 860 (e.g., as identified by a machine learning model within a natural language request to perform a testing action as described herein) and an application tag 865 (e.g., the application under test). The query processor 850 can then query the object repository 810 with the application tag 865 and indication of the interface control 860 to retrieve a unique object repository identifier from the object repository 810, which can be persisted for subsequent use. Later, when execution is triggered, the object repository identifier 880 can be used to retrieve the control identifier from the repository 810.

Variations in definitions are possible while still supporting the automated testing techniques described herein.

Example 22—Example Detailed Solution Flow

Figure 9:
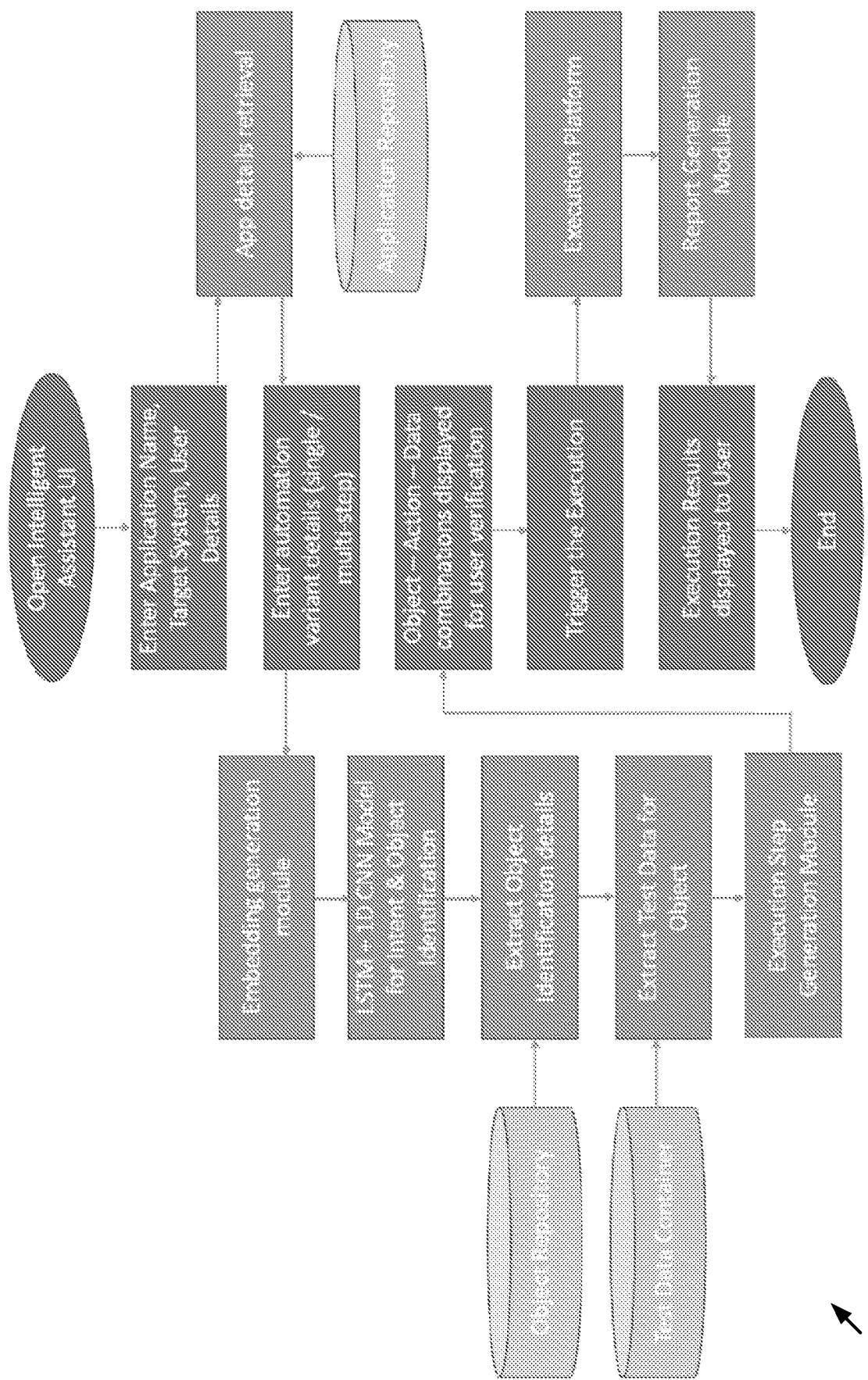
FIG. 9 is a block diagram of an example detailed solution flow for implementing an intelligent digital assistant for software testing automation.

FIG. 9 is a block diagram of an example detailed solution flow 900 for implementing an intelligent digital assistant for software testing automation that can be used for any of the examples herein.

In the example, an open intelligent assistant user interface is presented. The digital assistant user interface can be used by a testing user to enter an application name, target system, and user details. The application details can be retrieved from the application repository using the application name. Details about the automation variant can be entered (e.g., whether single or multiple step).

Filtering can be done based on the application name. For example, the system can check wither the application is available as indicated in the application repository. If so, the respective application tag can be returned. If not, an error condition is raised. For example, the user interface can indicate whether or not the application is supported by the digital assistant.

As requests are received, an embedding generation model can communicate with a long short-term memory (LSTM) and 1D convolutional neural network (CNN) model for intent and object (e.g., control) identification. Object identification details (e.g., control identifier) can be extracted from the object repository. If test data is needed, it can be extracted from the test data container. An execution step generation module can execute and/or generate executable code. If desired, the control, action, and data combinations can be displayed for user verification. Then, execution can be triggered, which executes the code on the execution platform. A report generation module can generate a report and results can be displayed to the user. For example, details of which actions failed or were successful can be stored to a log, and access to the log can be provided by the digital assistant (e.g., via a link to the log file).

If during the process, a user wishes to reset the application name, system/client, or requests, a reset function can be provided for doing so.

Example 23—Example Requests and Intents/Objects

FIG. 10 is a walkthrough 1000 of different natural language requests showing resulting intents and objects.

A first example involves "Enter Order Type as OR." The intent is recognized as "field" (e.g., enter data into a field). "Order Type" is recognized as an object (control indication), and "OR" is recognized as a value. Accordingly, executable code to input "OR" into the "Order Type" field can be executed.

A second example involves "Check if Customer field is disabled." The intent is recognized as "check" (e.g., verify control state). "Customer" is recognized as an object (control indication), and "disabled" is recognized as a value.

The third example involves the request "Click on Add button." The intent is recognized as "button" (e.g., activate a button). "Add" is recognized as an object (control indication). No value is recognized, and none is needed for a "button" intent.

The fourth example involves multiple step execution ("Create Sales Order with Customer 103001, Order Type OR, one Material TG0011 with quantity 10 and Plant 1010, and click Save"). There are multiple intents. First, for an "appname" intent, "Create Sales Order" is recognized as an object (application name). The application "Create Sales Order" can be launched or given focus. Next, a variety of values for fields are provided. Finally, for "click Save," the intent is recognized as "button," and the value object is "Save" (control indication).

The fifth example ("Create Sales Order with Customer, Order Type, one Material with quantity and Plant, and click Save") also involves multiple step execution, and data is picked from the test data container if not entered. For the "appname" intent, "Create Sales Order" is recognized as the object (application name). Then, field intents are recognized; because no values are specified, values are drawn from the test data container. Finally, the "button" intent with object "Save" is recognized.

The sixth example involves the request "Create Sales Order with existing data from the TDC." The intent appname is recognized with the object "Create Sales Order" and the next intent is simply pick_from_tdc (e.g., fill in the fields using the test data container).

Although not shown, additional intents can be recognized as appropriate. Intents can be enhanced by using additional training data.

Additional processing can be done to convert objects (e.g., control indications) into control identifiers for use in executable statements to achieve the testing action indicated in the request.

Example 24—Example Executable Statement Generation

Given intents and objects (e.g., control indicators or control identifiers) and, optionally, values, an executable statement can be executed to perform the requested testing action. Examples of such executable statements are shown below with reference to Python with Selenium statements, but in practice, any number of techniques can be used. In practice, executing executable code comprises choosing an executable statement type (or template) based on the given intent identifier and incorporating the user interface control identifier in the statement. Values can also be included.

An example of executable code for the "field" intent is shown in Table 1. Step [0] contains the intent; step [1] contains the control; step [2] contains the data value.

TABLE 1

Example Code for the "field" Intent

```
if step[0] == 'field':
   try:
      userField = driver.find_element(By.ID, control_id)
      userField.send_keys(step[2])
      time.sleep(2)
   except:
      execution_log.append("Value enter for " + step[1] + " failed")
   else:
      execution_log.append("Enter value in " + step[1] + " successful")
```

An example of executable code for the "button" intent is shown in Table 2.

TABLE 2

Example Code for the "button" Intent

```
if step[0] == 'button':
   try:
      clickButton = driver.find_element(By.ID, control_id)
      clickButton.click( )
      time.sleep(2)
   except:
      execution_log.append("Click on button" + step[1] + " failed")
   else:
      execution_log.append("Click on button " + step[1] + " successful")
```

Similar approaches can be used for other intents. Specialized intents such as "get" can be implemented as shown in Table 3.

TABLE 3

Example Code for the "get" Intent

```
if step[0] == 'gets':
   print("getsctrl = driver.find_element(By.ID, '" + control_id + "')")
   print("getsctrl.get_attribute('value')")
   print("time.sleep(1)")
```

In practice, other languages can be used to execute executable code. In embodiments generating scripts, the script can be in any number of languages.

Example 25—Example Implementation

In an example implementation, a model can accept an input request, predict the user's intention, and attempts to do semantic slot filling for the recognized intent.

For example, given the input request "Enter Purchase Order field value as PO123," the model generated slot filling of "O-Object-Object-O-O-O-Value." "Purchase Order" was recognized as an object (control indication), and the intent was recognized as "Field."

A neural network can be built using Keras with a Tensorflow backend.

Suitable data can be identified to model the problem. Training data can be prepared that refers to a large number of applications. Various controls can be extracted, and different ways of providing requests for testing actions can be enumerated. Training data can be generated by pairing (e.g., randomly) the different actions, control names, and type of control identified with the intent. Pre-trained GloVe embeddings can be used for the model. This can also be further enhanced using Transformer based embeddings.

Modeling can be achieved with a long short-term memory (LSTM) neural network and a convolutional neural network (CNN). LTSM can work well with sequential data and can handle natural language processing tasks, and CNN works for spatially related data (e.g., proximity). Given that CNNs are translation invariant, they can detect textual patters regardless of their position in the request.

In one implementation, over 3,000 data entries were used to train and validate the intent and label models (30% validation split) with "softmax" activation for the output layers and "categorial cross entropy" as the loss function. To prevent overfitting, a combination of drop out and L2 regularizations were used.

Such modeling satisfied specified goals and allowed use of the output (e.g., intent, object, value). The output can be passed to logic that generates Python-Selenium code, where the commands can be generated using reference to the object repository table.

Depending on the number of actions and data provided in the request by the testing user, the intent, object, and value identification can be dynamically handled. Examples are shown herein with reference to FIG. 10.

Example 26—Example Advantages

Several advantages can be achieved via the technologies described herein. For example, a traditional approach where testers manually generate scripts struggles to stay current in an environment with a focus on continuous feature deliveries and shorter release cycles in the cloud. Instead, rapid and timely testing can be performed with the digital assistant described herein.

The described digital assistant enables those without automation experience to conduct the tests as needed. The testing user need not be concerned about the internal complexities of automation code creation and related setup activities.

Given the multiplicity of options and functions being incorporated into applications, the effort to perform testing grows. So, simplifying the testing process provides a growing benefit to the testing effort.

Automating and maintaining scripts for every possible execution flow is not scalable and ends up taking as much effort as developing the code. The digital assistant can solve such a problem.

As described, if a runtime approach is taken, scripts need not be stored, so storage space is reduced, resulting in conservation of computing resources.

Example 27—Example Implementations

Any of the following can be implemented.
Clause 1. A computer-implemented method comprising:
in a digital assistant user interface, receiving a natural language request to perform a testing action in a user interface of an application, wherein the natural language request comprises an indication of a user interface control of the user interface of the application;
inputting the natural language request to a natural language processing model with deep learning, wherein the natural language processing model with deep learning is trained, with a plurality of natural language testing action phrases, to identify software testing intents and indications of user interface controls;

receiving, from the natural language processing model with deep learning, one or more software testing intent identifiers and a user interface control indication, wherein a given software testing intent identifier of the one or more intent identifiers is associated with the user interface control indication; and based on the given software testing intent identifier and the user interface control indication, executing executable code to carry out the natural language request to perform the testing action for the application.

Clause 2. The method of Clause 1, wherein:
the natural language request to perform the testing action comprises multiple testing actions;
the natural language processing model recognizes the multiple testing actions; and
the executable code performs the multiple testing actions.

Clause 3. The method of any one of Clauses 1-2, wherein:
the natural language request to perform the testing action comprises multiple scenarios and multiple testing actions;
the natural language processing model recognizes the multiple testing actions; and
the executable code performs the multiple testing actions for each of the multiple scenarios.

Clause 4. The method of any one of Clauses 1-3, wherein:
the natural language request to perform the testing action comprises multiple testing actions and specifies multiple data sets;
the natural language processing model recognizes the multiple testing actions and the multiple data sets; and
the executable code performs the multiple testing actions with the multiple data sets.

Clause 5. The method of any one of Clauses 1-4, further comprising:
based on a repository of user interface controls comprising user interface control definitions of the application, determining a user interface control identifier identifying the user interface control indicated by the user interface control indication.

Clause 6. The method of any one of Clauses 1-5, further comprising:
responsive to determining that an intent of the given software testing intent identifier has a data value prerequisite and the natural language request does not specify a value for testing, reading the value for testing from a test data container; and incorporating the value into the executable code.

Clause 7. The method of any one of Clauses 1-6, wherein:
the natural language testing phrases comprise randomly-generated natural language testing phrases generated with natural language intent indication variants.
the natural language processing model is trained with user interface control definitions.

Clause 8. The method of any one of Clauses 1-7, wherein:
Clause 9. The method of any one of Clauses 1-8, wherein:
the natural language processing model with deep learning is trained to identify user interface control indications of the application with user interface control definitions of the application stored in a user interface object repository.

Clause 10. The method of any one of Clauses 1-9, wherein:
executing the executable code comprises choosing an executable statement type based on the given software testing intent identifier and including a user interface control identifier counterpart of the user interface control indication in the executable statement.

Clause 11. The method of any one of Clauses 1-10, wherein:
the testing action comprises pushing a button of the user interface of the application;
the given software testing intent identifier indicates pushing of a button; and
the executable code performs pushing the button of the user interface of the application.

Clause 12. The method of any one of Clauses 1-11, wherein:
the natural language processing model recognizes the following intents:
field entry;
button press; and
check value.

Clause 13. The method of any one of Clauses 1-12, wherein:
the natural language request to perform a testing action specifies an action to be performed on an input field;
the one or more software testing intents comprises a field entry intent;
the input field has a field identifier not specified in the natural language request;
the natural language processing model recognizes that the testing action is to be performed on the input field and outputs a user interface control identifier of the input field.

Clause 14. The method of any one of Clauses 1-13, wherein:
the natural language request to perform a testing action specifies entering a value into a field;
the one or more software testing intents comprises a field entry intent;
the natural language processing model outputs the value;
the user interface control indication indicates the field; and
the executable code contains instructions to place the value in the field.

Clause 15. The method of any one of Clauses 1-14, further comprising:
receiving an application name of the application;
determining an application tag of the application via an application repository; and
performing testing with the application tag.

Clause 16. The method of any one of Clauses 1-15, further comprising:
receiving user details;
receiving target system identifier; and
performing testing with the user details and target system identifier.

Clause 17. The method of any one of Clauses 1-16, further comprising:
training the natural language processing model with the plurality of natural language testing action phrases generated from user interface control definitions of a user interface object repository.

Clause 18. A computing system comprising:
at least one hardware processor;
at least one memory coupled to the at least one hardware processor;
a trained natural language processing model with deep learning, wherein the trained natural language processing model with deep learning is trained to identify intents and indications of user interface controls of an application with intent variations and user interface control definitions of a user interface object repository; and one or more non-transitory computer-readable media having stored therein computer-executable instructions that, when executed by the computing system, cause the computing system to perform:
in a digital-assistant-style user interface, receiving a natural language request to perform a testing action in a user interface of an application;
inputting the natural language request to the trained natural language processing model with deep learning;
receiving from the natural language processing model with deep learning, an intent identifier and a user interface control indication;
based on the intent identifier and the user interface control indication, executing executable code to carry out the natural language request to perform the testing action for the application.

Clause 19. The computing system of Clause 18, further comprising:
a test data container;
wherein the computer-executable instructions, when executed, further cause the computing system to perform:
responsive to determining that an intent of the intent identifier has a data value prerequisite and the natural language request does not specify a value for testing, reading the value for testing from the test data container; and
incorporating the value into the executable code.

Clause 20. One or more non-transitory computer-readable media comprising computer-executable instructions that, when executed by a computing system, cause the computing system to perform operations comprising:
with a plurality of natural language testing action phrases and user interface control definitions stored in a user interface object repository of an application, training a natural language processing model with deep learning;
presenting a digital-assistant-style user interface configured to receive natural language software testing requests;
receiving a natural language software testing request comprising an indication of a testing action and an indication of a user interface control of a user interface of the application;
with the natural language processing model implementing deep learning, accepting the natural language software testing request and outputting an intent identifier and a user interface object indication as indicated in the natural language software testing request;
translating the intent identifier and the user interface object indication into executable code for carrying out the natural language software testing request, wherein translating comprises querying an object repository for an identifier of the user interface control;
executing the executable code, wherein the executing performs the testing action on the application executing in a software testing environment; and
outputting results of the testing action.

Example 28—Example Computing Systems

Figure 11:
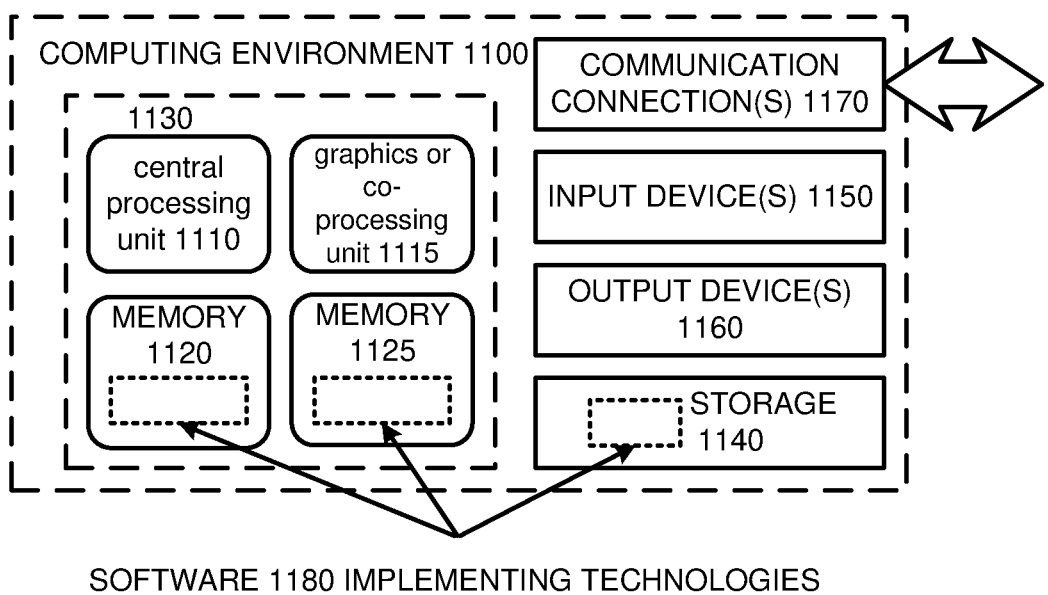
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 can have additional features. For example, the computing system 1100 includes storage 1140, one or more input devices 1150, one or more output devices 1160, and one or more communication connections 1170, including input devices, output devices, and communication connections for interacting with a user. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 29—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 30—Example Cloud Computing Environment

Figure 12:
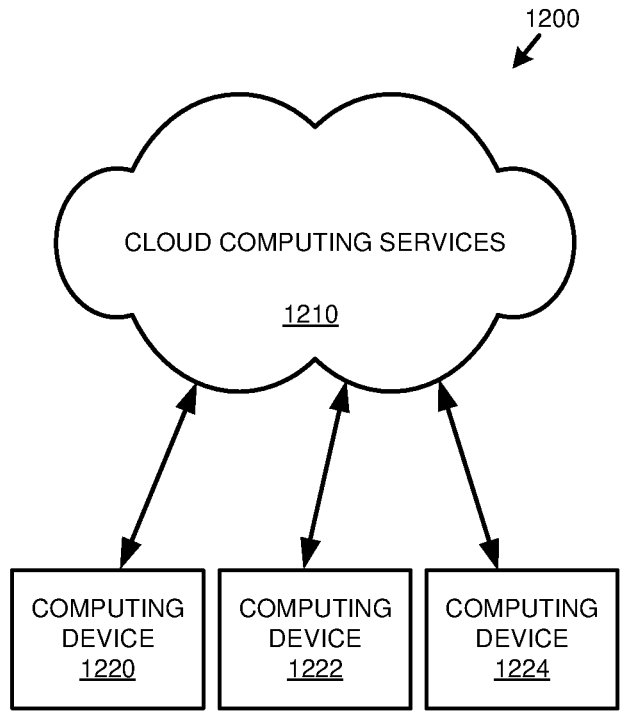
FIG. 12 is a block diagram of an example cloud computing environment that can be used in conjunction with the technologies described herein.

FIG. 12 depicts an example cloud computing environment 1200 in which the described technologies can be implemented, including, e.g., the system 100 of FIG. 1 and other systems herein. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example 31—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 32—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
in a digital assistant user interface, receiving a natural language request to perform a testing action in a user interface of an application, wherein the natural language request comprises an indication of a user interface control of the user interface of the application;
inputting the natural language request to a natural language processing model with deep learning, wherein the natural language processing model with deep learning is trained, with a plurality of natural language testing action phrases, to identify software testing intents and indications of user interface controls, wherein the plurality of natural language testing action phrases comprises randomly-generated natural language testing phrases generated based on one or more template phrases;
receiving, from the natural language processing model with deep learning, one or more software testing intent identifiers and a user interface control indication, wherein a given software testing intent identifier of the one or more intent identifiers is associated with the user interface control indication; and
based on the given software testing intent identifier and the user interface control indication, executing executable code to carry out the natural language request to perform the testing action for the application.

2. The method of claim 1, wherein:
the natural language request to perform the testing action comprises multiple testing actions;
the natural language processing model recognizes the multiple testing actions; and
the executable code performs the multiple testing actions.

3. The method of claim 1, wherein:
the natural language request to perform the testing action comprises multiple scenarios and multiple testing actions;
the natural language processing model recognizes the multiple testing actions; and
the executable code performs the multiple testing actions for each of the multiple scenarios.

4. The method of claim 1, wherein:
the natural language request to perform the testing action comprises multiple testing actions and specifies multiple data sets;

the natural language processing model recognizes the multiple testing actions and the multiple data sets; and the executable code performs the multiple testing actions with the multiple data sets.

5. The method of claim 1, further comprising:

based on a repository of user interface controls comprising user interface control definitions of the application, determining a user interface control identifier identifying the user interface control indicated by the user interface control indication.

6. The method of claim 1, further comprising:

responsive to determining that an intent of the given software testing intent identifier has a data value prerequisite and the natural language request does not specify a value for testing, reading the value for testing from a test data container; and incorporating the value into the executable code.

7. The method of claim 1, wherein:

the natural language processing model is trained with user interface control definitions.

8. The method of claim 1, wherein:

the natural language processing model with deep learning is trained to identify user interface control indications of the application with user interface control definitions of the application stored in a user interface object repository.

9. The method of claim 1, wherein:

executing the executable code comprises choosing an executable statement type based on the given software testing intent identifier and including a user interface control identifier counterpart of the user interface control indication in the executable statement.

10. The method of claim 1, wherein:

the testing action comprises pushing a button of the user interface of the application;

the given software testing intent identifier indicates pushing of a button; and the executable code performs pushing the button of the user interface of the application.

11. The method of claim 1, wherein:

the natural language processing model recognizes the following intents:

field entry;

button press; and check value.

12. The method of claim 1, wherein:

the natural language request to perform a testing action specifies an action to be performed on an input field;

the one or more software testing intents comprises a field entry intent;

the input field has a field identifier not specified in the natural language request;

the natural language processing model recognizes that the testing action is to be performed on the input field and outputs a user interface control identifier of the input field.

13. The method of claim 1, wherein:

the natural language request to perform a testing action specifies entering a value into a field;

the one or more software testing intents comprises a field entry intent;

the natural language processing model outputs the value;

the user interface control indication indicates the field; and the executable code contains instructions to place the value in the field.

14. The method of claim 1, further comprising:

receiving an application name of the application;

determining an application tag of the application via an application repository; and performing testing with the application tag.

15. The method of claim 1, further comprising:

receiving user details;

receiving target system identifier; and performing testing with the user details and target system identifier.

16. The method of claim 1, further comprising:

training the natural language processing model with the plurality of natural language testing action phrases generated from user interface control definitions of a user interface object repository.

17. A computing system comprising:

at least one hardware processor;

at least one memory coupled to the at least one hardware processor;

a trained natural language processing model with deep learning, wherein the trained natural language processing model with deep learning is trained to identify intents and indications of user interface controls of an application with intent variations and user interface control definitions of a user interface object repository, wherein the intent variations comprise randomly-generated natural language testing phrases generated based on one or more template phrases; and one or more non-transitory computer-readable media having stored therein computer-executable instructions that, when executed by the computing system, cause the computing system to perform:

in a digital-assistant-style user interface, receiving a natural language request to perform a testing action in a user interface of an application;

inputting the natural language request to the trained natural language processing model with deep learning;

receiving from the natural language processing model with deep learning, an intent identifier and a user interface control indication;

based on the intent identifier and the user interface control indication, executing executable code to carry out the natural language request to perform the testing action for the application.

18. The computing system of claim 17, further comprising:

a test data container;

wherein the computer-executable instructions, when executed, further cause the computing system to perform:

responsive to determining that an intent of the intent identifier has a data value prerequisite and the natural language request does not specify a value for testing, reading the value for testing from the test data container; and incorporating the value into the executable code.

19. One or more non-transitory computer-readable media comprising computer-executable instructions that, when executed by a computing system, cause the computing system to perform operations comprising:

with a plurality of natural language testing action phrases and user interface control definitions stored in a user interface object repository of an application, training a natural language processing model with deep learning, wherein the plurality of natural language testing action phrases comprises randomly-generated natural language testing phrases generated based on one or more template phrases;

presenting a digital-assistant-style user interface configured to receive natural language software testing requests;

receiving a natural language software testing request comprising an indication of a testing action and an indication of a user interface control of a user interface of the application;

with the natural language processing model implementing deep learning, accepting the natural language software testing request and outputting an intent identifier and a user interface object indication as indicated in the natural language software testing request;

responsive to determining that an intent of the intent identifier has a data value prerequisite and the natural language software testing request does not specify a value for testing, reading the value for testing from a test data container;

translating the intent identifier and the user interface object indication into executable code incorporating the value for carrying out the natural language software testing request, wherein translating comprises querying an object repository for an identifier of the user interface control;

executing the executable code, wherein the executing performs the testing action on the application executing in a software testing environment; and outputting results of the testing action.

* * * * *